(12) United States Patent
Harpur et al.

(10) Patent No.: US 10,585,970 B2
(45) Date of Patent: Mar. 10, 2020

(54) MANAGING DYNAMIC WEBPAGE CONTENT

(71) Applicant: International Business Machines Corporation, Armonk, NY (US)

(72) Inventors: Liam S. Harpur, Dublin (IE); Erik H. Katzen, Argyle, TX (US); Sumit Patel, Irving, TX (US); Gregor Schikorski, Nackenheim (DE)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 14/995,221

(22) Filed: Jan. 14, 2016

(65) Prior Publication Data
US 2017/0206283 A1    Jul. 20, 2017

(51) Int. Cl.
*G06F 16/958*    (2019.01)
*G06F 16/951*    (2019.01)
*G06F 16/957*    (2019.01)

(52) U.S. Cl.
CPC .......... *G06F 16/972* (2019.01); *G06F 16/951* (2019.01); *G06F 16/957* (2019.01)

(58) Field of Classification Search
CPC ............................. G06F 16/951; G06F 16/957
See application file for complete search history.

(56) References Cited

U.S. PATENT DOCUMENTS

| | | | |
|---|---|---|---|
| 6,253,234 B1 * | 6/2001 | Hunt ...................... | H04L 67/02 709/213 |
| 7,418,661 B2 * | 8/2008 | Brandenberger ..... | G06F 16/958 715/255 |
| 8,082,539 B1 | 12/2011 | Schelkogonov et al. | |
| 8,914,441 B2 | 12/2014 | Quintuna | |
| 2003/0033378 A1 | 2/2003 | Needham et al. | |
| 2006/0064467 A1 | 3/2006 | Libby | |
| 2008/0046562 A1 | 2/2008 | Butler | |
| 2009/0287684 A1 * | 11/2009 | Bennett ................. | G06F 16/958 |
| 2011/0295936 A1 * | 12/2011 | Gill ........................ | G06F 16/954 709/203 |
| 2013/0041881 A1 * | 2/2013 | Wierman ................ | H04L 67/22 707/709 |
| 2015/0227630 A1 * | 8/2015 | Solheim .............. | G06F 16/9535 707/722 |
| 2016/0034435 A1 * | 2/2016 | Patidar ................... | G06F 17/24 715/255 |

* cited by examiner

*Primary Examiner* — Charles E Lu
(74) *Attorney, Agent, or Firm* — Edward J. Wixted, III

(57) ABSTRACT

In an approach for managing webpage content access across a group of users, a computer receives a group comprising one or more users. The computer receives a webpage associated with the group. The computer stores at least one snapshot of the received webpage. The computer receives a request to access the received webpage from a user wherein the user is a member of the received group. The computer selects a snapshot from the stored at least one snapshot based on the received request to access the received webpage. The computer provides the selected snapshot from the stored at least one snapshot to the user associated with the received request.

20 Claims, 3 Drawing Sheets

MANAGING DYNAMIC WEBPAGE CONTENT

BACKGROUND

The present invention relates generally to the field of Internet based content, and more particularly to managing the version of content viewed by a user.

The World Wide Web (www) is an open source information space where documents and other web resources (e.g., webpages, blogs, forums, etc.) are identified by uniform resource locators (URLs), interlinked by hypertext links, and can be accessed via the Internet by users. Web browsers retrieve, present, and traverse information resources of the World Wide Web, starting with the input of a URL associated with a website (e.g., set of related webpages). The web browser breaks the URL into three parts, a protocol (e.g., http, https, ftp, etc.), a server name, and a file name. The web browser communicates with a name server to translate the server name into an internet protocol (IP). The web browser forms a connection to the web server using the IP address, and requests the file name from the web server. The web server sends the HTML text for the webpage to the web browser, which reads the HTML tags and formats the webpage for viewing. The first time the web browser accesses a webpage, the web browser renders the webpage and stores a local copy in cache. The next time the web browser accesses the same webpage, the web browser compares the date of the file within cache and the date of the file on the Internet with the cache and determines where to load the webpage from. If the date of the file on the Internet is newer, the web browser downloads the new webpage. However, if the date of the files are the same, the web browser utilizes the webpage stored in cache.

HTTP defines three basic mechanisms for controlling caches: freshness, validation, and invalidation. Freshness allows a cached response to be used without re-checking the cached response on the web server, and can be controlled by both the web server and the client. For example, an Expires response header provides a date when the document becomes stale, and a Cache-Control max-age directive tells the cache how long (i.e., an amount of time) the cached response is fresh for. After the time expires, the web browser checks with the web server to identify content changes to the webpage. Validation can be used to check whether a cached response is still good after the cached response becomes stale. For example, if the cached response has a Last-Modified header, a conditional request can be made using the If-Modified-Since header to determine whether changes occurred. Invalidation is usually a side effect of another request that passes through the cache. For example, a URL associated with a cached response receives a POST, PUT or DELETE request, and invalidates the cached response.

SUMMARY

Aspects of the present invention disclose a method, computer program product, and system for managing webpage content access across a group of users. The method includes one or more computer processors receiving a group comprising one or more users. The method includes one or more computer processors receiving a webpage associated with the group. The method further includes one or more computer processors storing at least one snapshot of the received webpage. The method further includes one or more computer processors receiving a request to access the received webpage from a user wherein the user is a member of the received group. The method further includes one or more computer processors selecting a snapshot from the stored at least one snapshot based on the received request to access the received webpage. The method further includes one or more computer processors providing the selected snapshot from the stored at least one snapshot to the user associated with the received request.

DETAILED DESCRIPTION

HTTP requests made by a web browser are first routed to the associated cache in order to determine whether a valid cached response can fulfill the request. If a match exists, the response is read from the cache. If a match does not exist, the web browser retrieves a response from the web server and stores the response in cache. Once a response is cached by the web browser, the cached version will be used until the cached response fails due to freshness, validation, or invalidation. As a result, as recognized by embodiments of the present invention, different users may utilize different versions of the file. For example, users that just retrieved the resource will use the new version, while users that cached an earlier, but still valid copy, will use an older version of the cached response. Embodiments of the present invention are capable of storing multiple versions of a webpage as the webpage updates as snapshots. Embodiments of the present invention select a snapshot from the multiple versions of snapshots available, and provide the same selected snapshot to group members, thus ensuring the group members are utilizing a unified version of the snapshot. Additionally, embodiments of the present invention can define the validity duration of a version of a snapshot, and control when to introduce an updated snapshot to the group members. Embodiments of the present invention are therefore able to schedule and control the frequency of content updates, ensuring each separate user receives unified information that results in streamlined experiences and collaboration for remote teams accessing frequently changing webpage content.

Figure 1:
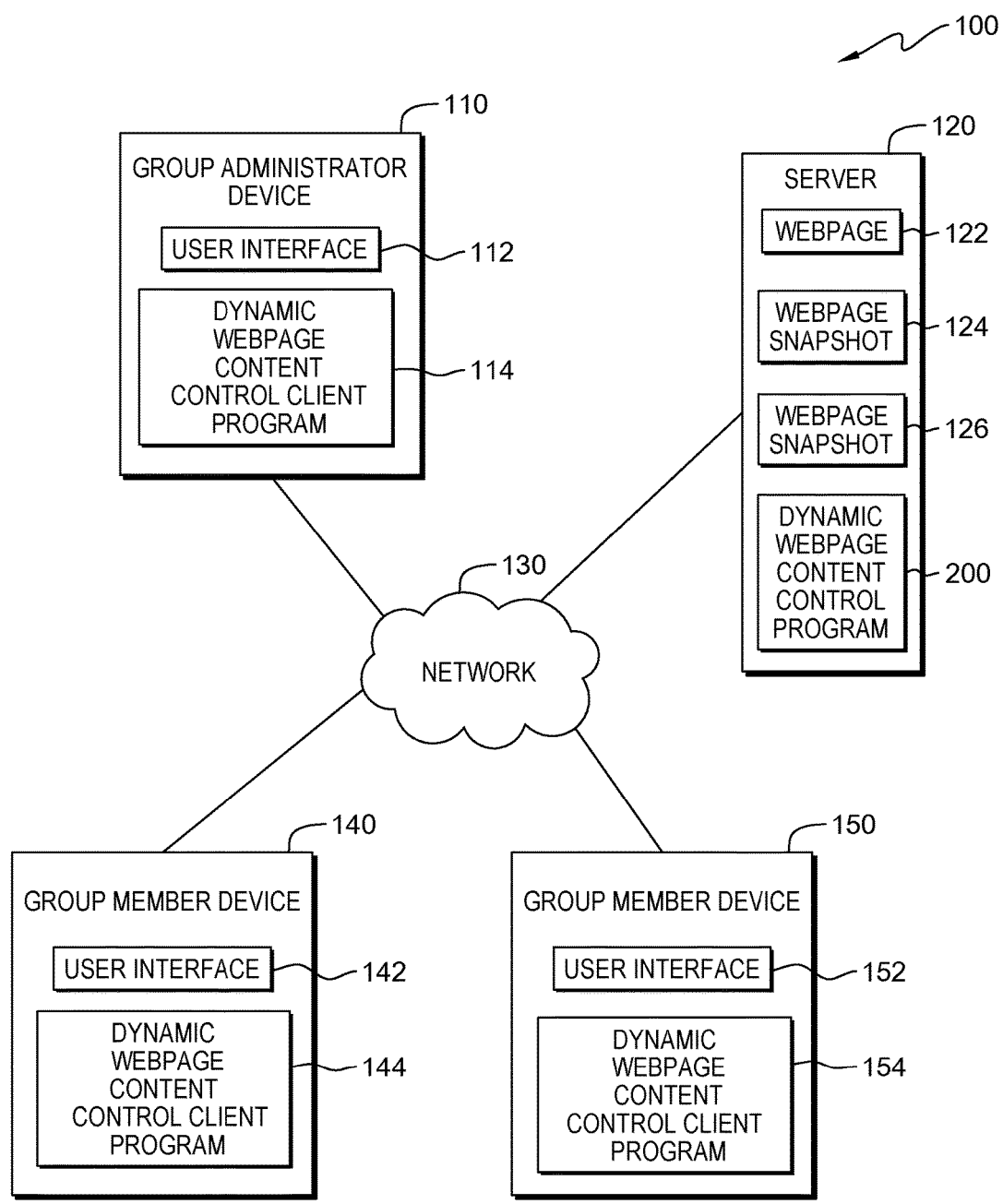
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes group administrator device 110, group member device 140, group member device 150 and server 120 interconnected over network 130. Distributed data processing environment 100 may include additional group member devices, computing devices, mobile computing devices, servers, computers, storage devices, or other devices not shown.

Group administrator device 110, group member device 140, and group member device 150, may be any electronic device or computing system capable of processing program instructions and receiving and sending data. In some embodiments, group administrator device 110, group member device 140, and group member device 150 may be a laptop computer, a tablet computer, a netbook computer, a personal computer (PC), a desktop computer, a personal digital assistant (PDA), a smart phone, or any programmable electronic device capable of communicating with network 130. In other embodiments, group administrator device 110, group member device 140, and group member device 150 may represent a server computing system utilizing multiple computers as a server system, such as in a cloud computing environment. In other embodiments, group administrator device 110, group member device 140, and group member device 150 may include dynamic webpage content control client program 114, 144 and 154, user interfaces 112, 142 and 152, as depicted and described in further detail with respect to FIG. 3.

Group administrator device 110 is a computing device associated with a user designated as a system administrator, and is responsible for adding and/or deleting group members, and controlling the system group members connect to by providing criteria to dynamic webpage content control program 200 for further utilization through dynamic webpage content control client program 114. Group administrator device 110 contains user interface 112 and dynamic webpage content control client program 114. Group member devices 140 and 150 are computing devices associated with users that are part of a group of individuals as designated through group administrator device 110. Group member devices 140 and 150 receive content from dynamic webpage content control program 200 through dynamic webpage content control client program 144 and 154, respectively. Group member devices 140 and 150 contain user interfaces 142 and 152, and dynamic webpage content control client program 144 and 154, respectively.

User interfaces 112, 142, and 152 are programs that provide an interface between a user of group administrator device 110, group member device 140, and group member device 150, and a plurality of applications that reside on group administrator device 110, group member device 140, and group member device 150 (e.g., dynamic webpage content control client programs 114, 144, and 154), and/or may be accessed over network 130. A user interface, such as user interfaces 112, 142, and 152, refers to the information (e.g., graphic, text, sound) that a program presents to the user and the control sequences the user employs to control the program. A variety of types of user interfaces exist. In one embodiment, user interfaces 112, 142, and 152, are graphical user interfaces. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interfaces 112, 142, and 152, send and receive information through dynamic webpage content control client programs 114, 144, and 154 to dynamic webpage content control program 200.

Dynamic webpage content control client programs 114, 144, and 154 are a set of one of more programs designed to carry out the operations for a specific application to assist a user to perform an activity (e.g., connect to a version of content as specified by dynamic webpage content control program 200). Dynamic webpage content control client programs 114, 144, and 154 send and receive information and content to and from dynamic webpage content control program 200. Dynamic webpage content control client programs 114 provides criteria to dynamic webpage content control program 200. For example, an administrator through dynamic webpage content control client programs 114 sets criteria regarding a number of instances of web content to store, a frequency to check webpage 122 for updates, and indicates whether to display webpage snapshot 124 or 126 to the users associated with group member devices 140 and 150. Dynamic webpage content control client programs 144 and 154 access the indicated version of webpage snapshots 124 or 126 and tracks user activity for analysis. In the depicted embodiment, dynamic webpage content control client programs 114, 144, and 154 reside on group administrator device 110, group member device 140, and group member device 150, respectively. In another embodiment, dynamic webpage content control client programs 114, 144, and 154, may reside on server 120 or on another device (not shown) connected over network 130, provided dynamic webpage content control client programs 114, 144, and 154 are able to access dynamic webpage content control program 200.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with group administrator device 110, group member device 140, and group member device 150 over network 130. In other embodiments, server 120 may represent a server computing system utilizing multiple computers as a server system, such as in a cloud computing environment. In general, server 120 is representative of any electronic device or combination of electronic devices capable of executing machine readable program instructions as described in greater detail with regard to FIG. 3, in accordance with embodiments of the present invention. Server 120 contains webpage 122, webpage snapshot 124, webpage snapshot 126, and dynamic webpage content control program 200. In other embodiments, server 120 may include dynamic webpage content control program 200, webpage 122, webpage snapshot 124, and webpage snapshot 126, as depicted and described in further detail with respect to FIG. 3.

Webpage 122 is a webpage accessed via a website that is hosted on at least one web server, accessible via a network such as the Internet or a private local area network through a URL. Webpages are documents, typically written in plain text interspersed with formatting instructions of Hypertext Markup Language (HTML). Webpages are accessed and transported with the Hypertext Transfer Protocol (HTTP) through a web browser, which upon receipt, renders the webpage content according to the associated HTML markup instructions onto a display terminal. Dynamic webpage content control program 200 accesses webpage 122 and creates a snapshot of the content of webpage 122 (e.g., webpage snapshot 124, webpage snapshot 126) for future display to a user associated with group member device 140 and/or 150 based on criteria set by group administrator device 110 and/or dynamic webpage content control program 200. In the depicted embodiment, webpage 122 resides on server 120.

Webpage snapshot 124 and webpage snapshot 126, are snapshots (i.e., state of a system at a particular point in time) of the content of webpage 122 created by dynamic webpage content control program 200 based off of webpage 122 that may include updates. For example, webpage snapshot 124 is a snapshot taken by dynamic webpage content control program 200 of an initial published version of webpage 122. Webpage snapshot 126 is a snapshot taken by dynamic webpage content control program 200 of a later published version of webpage 122 that includes updates (e.g., differences from the initial published version of webpage snapshot 124). While the depicted embodiment only displays webpage snapshot 124 and webpage snapshot 126, additional snapshots of webpage content may be stored in additional instances of webpage content (not shown). The number of instances of web content (e.g., snapshots) is set through group administrator device 110, dynamic webpage content control program 200, and or dependent upon the frequency in which webpage 122 updates. In the depicted embodiment, webpage snapshot 124 and webpage snapshot 126 reside on server 120. In another embodiment, webpage snapshot 124 and/or webpage snapshot 126 may reside on group administrator device 110, group member device 140, and/or group member device 150 provided webpage snapshot 124 and webpage snapshot 126 are accessible to group administrator device 110, group member device 140, and group member device 150.

Network 130 may be a local area network (LAN), a wide area network (WAN) such as the Internet, a wireless local area network (WLAN), any combination thereof, or any combination of connections and protocols that will support communications between group administrator device 110, group member device 140, and group member device 150, server 120, and other computing devices and servers (not shown), in accordance with embodiments of the inventions. Network 130 may include wired, wireless, or fiber optic connections.

Dynamic webpage content control program 200 is a program for storing one or more versions of webpage snapshots (e.g., webpage snapshot 124 and 126) and managing the version of webpage snapshot 124 or 126 viewed by users associated with group member devices 140 and 150. Dynamic webpage content control program 200 creates instances of webpage snapshot 124 and 126 by storing a snapshot of webpage 122 as defined (e.g., meets a set time interval, detects changes in webpage 122, etc.) within dynamic webpage content control program 200. Dynamic webpage content control program 200 provides webpage snapshot 124 or webpage snapshot 126 to the users of group member devices 140 and 150 to ensure both of the users access the same version of content. Dynamic webpage content control program 200 also analyzes the usage habits of the users to determine a frequency to update instances of webpage snapshots and to determine when users finish with an instance of webpage snapshots. In the depicted embodiment, dynamic webpage content control program 200 resides on server 120. In another embodiment, dynamic webpage content control program 200 resides on group administrator device 110 or on another computing device (not shown) provided that dynamic webpage content control program 200 has access to webpage 122.

Figure 2:
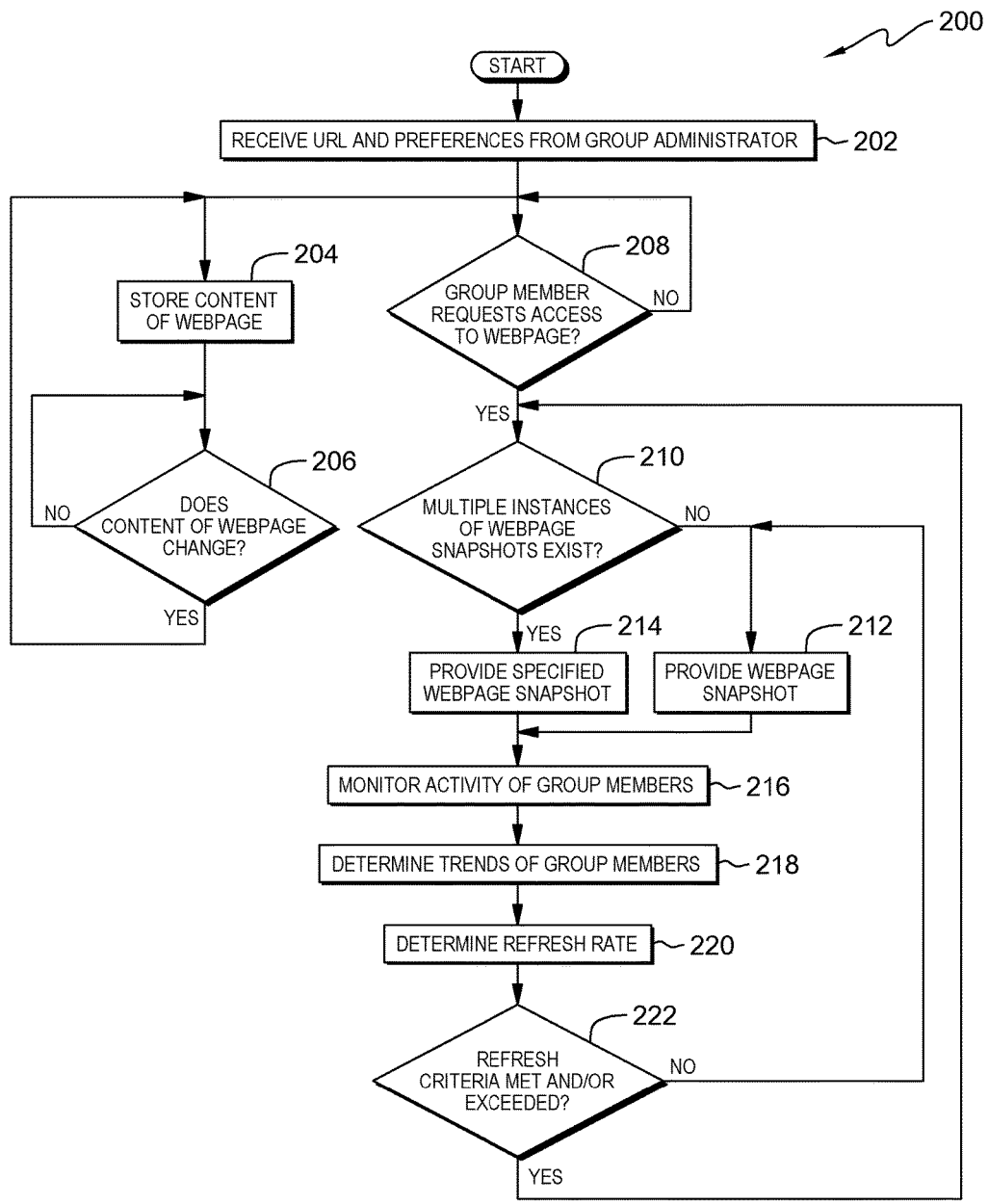
FIG. 2 is a flowchart depicting operational steps of a dynamic website content control program, on a server computer within the data processing environment of FIG. 1, for storing and managing dynamic webpage content viewable by a user and/or a group of users, in accordance with an embodiment of the present invention.

FIG. 2 is a flowchart depicting operational steps of dynamic webpage content control program 200, a program for storing and managing dynamic webpage content viewable by a user and/or a group of users, in accordance with an embodiment of the present invention. Prior to initiating, a group administrator identifies users as members of a group.

In step 202, dynamic webpage content control program 200 receives a URL associated with webpage 122 and preferences from a group administrator through dynamic webpage content control client program 114. In addition through the preferences, dynamic webpage content control program 200 receives a group assignment (e.g., identifies a group of one or more users that are to access webpage 122), and an indication of a version of a webpage snapshot (e.g., webpage snapshot 124, webpage snapshot 126, etc.) to provide to the users within the group (e.g. group member device 140, group member device 150, etc.). In some embodiments, dynamic webpage content control program 200 may additionally receive additional preferences (e.g., a refresh rate, a meta refresh, a number of instance of webpage content to store, refresh criteria, etc.). In the depicted embodiment, steps 204 through 206 occur in parallel with decision 208 through 222.

In step 204, dynamic webpage content control program 200 stores the content of webpage 122 within webpage snapshot 124 or 126. In one embodiment, dynamic webpage content control program 200 takes a snapshot of the current published version of webpage 122 which may include text, videos, images, comments, associated metadata, etc. In another embodiment, dynamic webpage content control program 200 receives webpage snapshot 124 or 126 as an uploaded scanned image. For example, an information source is a paper printout that the group administrator scans and uploads as webpage snapshot 124 or 126. Dynamic webpage content control program 200 stores an initial version of webpage 122 within webpage snapshot 124.

In another embodiment, dynamic webpage content control program 200 stores the content of webpage 122 within webpage snapshot 126 after dynamic webpage content control program 200 identifies changes to webpage 122 that are not in the current webpage snapshot (e.g., webpage snapshot 124). For example, webpage 122 is a blog. After dynamic webpage content control program 200 creates webpage snapshot 124, an additional post occurs within the blog, thus resulting in an update to webpage 122. Dynamic webpage content control program 200 identifies the additional post to the blog, which is not included in webpage snapshot 124. Dynamic webpage content control program 200 takes a second snapshot of webpage 122 and stores the second snapshot as webpage snapshot 126. Dynamic webpage content control program 200 continues to store the content of webpage 122 within additional instances of webpage snapshots as dynamic webpage content control program 200 identifies additional changes to webpage 122. In one embodiment, dynamic webpage content control program 200 may store an unspecified number of instances of webpage snapshots that is limited by the available storage space (i.e., continues to store additional webpage snapshots until memory is full and no longer available to store additional instances of webpage snapshots). In another embodiment, dynamic webpage content control program 200 may store a predefined number of instances of webpages snapshots as defined within the preferences established by the group administrator (e.g., three, five, one per day, etc.).

In decision 206, dynamic webpage content control program 200 determines whether the content the webpage of webpage 122 changes. Dynamic webpage content control program 200 revisits (e.g., polls, monitors, etc.) webpage 122. In one embodiment, dynamic webpage content control program 200 polls webpage 122 based on a webpage refresh rate (e.g., daily, hourly, weekly, etc.). For example, within the preferences the group administrator sets a webpage refresh rate at the end of each day to identify changes. In another embodiment, dynamic webpage content control program 200 revisits webpage 122 in response to the Expires response header becoming stale. In some other embodiment, dynamic webpage content control program 200 receives an update to webpage 122 when the web server pushes an update to webpage 122 (e.g., forces a change). In some other embodiment, dynamic webpage content control program 200 revisits webpage 122 based on a determined refresh rate (step 220) Dynamic webpage content control program 200 performs a comparison, and compares webpage 122 to the most recent instance of webpage snapshot 124 or 126 to identify changes (e.g., additions and/or deletions) to the overall content of webpage 122 (e.g., text, images, number of figures, etc.). In other embodiments, dynamic webpage content control program 200 compares webpage snapshots via methods known by one skilled in the art.

For example, a current instance of webpage 122 includes an image and text, and webpage snapshot 124 include an image, text, and a figure. Dynamic webpage content control program 200 compares webpage 122 with webpage snapshot 124, and determines while the image and text are the same between the current instance of webpage 122 and webpage snapshot 124, the figure is no longer included in the current instance of webpage 122. Dynamic webpage content control program 200 identifies the deletion of the figure within the content of the current instance of webpage 122 as a change to webpage 122, and therefore webpage snapshot 124 is no longer representative of the most current version of webpage 122.

If dynamic webpage content control program 200 determines the content of webpage 122 changes (decision 206, yes branch), then dynamic webpage content control program 200 stores the content of webpage 122 within an instance of a webpage snapshot (e.g., webpage snapshot 124, webpage snapshot 126). If dynamic webpage content control program 200 determines the content of webpage 122 does not change (decision 206, no branch), then dynamic webpage content control program 200 loops, thereby continuing to monitor webpage 122, and determines whether the content of webpage 122 changes (decision 206).

In decision 208, dynamic webpage content control program 200 determines whether a group member requests access to webpage 122. In one embodiment, a group member via user interfaces 142 and/or 152 requests access to webpage 122 through a standard web browser. Dynamic webpage content control program 200 receives user information (e.g., user name) and the URL associated with webpage 122 through dynamic webpage content control client program 144 and/or 154. Dynamic webpage content control program 200 compares the user information to stored information pertaining to the group members. Dynamic webpage content control program 200 identifies a match as a user belonging to the group as designated by the group administrator. Additionally, dynamic webpage content control program 200 compares the URL associated with webpage 122 to stored information identifying instances of webpage 122 that dynamic webpage content control program 200 controls. In an embodiment, in which dynamic webpage content control program 200 does not control the requested instances of webpage 122, webpage 122 loads without restrictions through the web browser.

In another embodiment, a user requests access to webpage 122 through a dedicated portal that connects directly to dynamic webpage content control program 200 (e.g., dynamic webpage content control client program 144 and/or 154, e-mail application, etc.). As the user connects to dynamic webpage content control program 200 through a direct portal, dynamic webpage content control program 200 determines if the user is a group member (e.g., enters a login with a username and/or password). Additionally through the direct portal, dynamic webpage content control program 200 may only provide instances of webpage 122 for which dynamic webpage content control program 200 controls the content of through webpage snapshots. After logging into the direct portal, dynamic webpage content control program 200 may provide a listing of the instance of webpage 122 that are available to the group member for selection.

If dynamic webpage content control program 200 determines a group member request access to webpage 122 (decision 208, yes branch), then dynamic webpage content control program 200 determines whether multiple instance of webpage snapshots exist. If dynamic webpage content control program 200 determines a group member does not request access to webpage 122 (decision 208, no branch), then dynamic webpage content control program 200 loops, and thereby continues to determine whether a group member requests access to webpage 122 (decision 208).

In decision 210, dynamic webpage content control program 200 determines whether multiple instances of webpage snapshots exist. Dynamic webpage content control program 200 receives a request via dynamic webpage content control client program 144 and/or 154 associated with webpage 122. In one embodiment, dynamic webpage content control program 200 identifies the number of instance of webpage snapshots in storage associated with the request. For example, dynamic webpage content control program 200 identifies webpage snapshot 124 and webpage snapshot 126 within storage associated with webpage 122. Based on identifying webpage snapshot 124 and webpage snapshot 126, dynamic webpage content control program 200 determines two instance of webpage snapshots exist for webpage 122. In another embodiment, dynamic webpage content control program 200 queries a counter that increase when dynamic webpage content control program 200 creates another instance of a webpage snapshot, and decrements when dynamic webpage content control program 200 deletes an instance of a webpage snapshot.

If dynamic webpage content control program 200 determines multiple instance of webpage snapshots exist (decision 210, yes branch), then dynamic webpage content control program 200 provides a single specified instance of a webpage snapshot to the group members (step 214). If dynamic webpage content control program 200 determines multiple instance of webpage snapshots do not exist (decision 210, no branch), then dynamic webpage content control program 200 provides the current instance of a webpage snapshot to the group members (step 212).

In step 212, dynamic webpage content control program 200 provides the webpage snapshot to the group members. In one embodiment, dynamic webpage control program provides the single stored instance of the webpage snapshot (e.g., webpage snapshot 124). In another embodiment dynamic webpage content control program 200 continues to provide the specified instance of the webpage snapshot (e.g., refresh rate has not expired, refresh rate expires but only a single webpage snapshot exists) to dynamic webpage content control client programs 144 and/or 154 for display through user interfaces 142 and 152. For example, dynamic webpage content control program 200 identifies only webpage snapshot 124 (e.g., single instance), and provides webpage snapshot 124 to dynamic webpage content control client programs 144 and/or 154 for display through user interfaces 142 and 152.

In another example, initially only webpage snapshot 124 exists. However, as dynamic webpage content control program 200 determines whether the content of webpage 122 changes (decision 206) in parallel, while dynamic webpage content control program 200 provides webpage snapshot 124 (step 212), dynamic webpage content control program 200 determines the content of webpage 122 changes (decision, 206, yes branch). Dynamic webpage content control program 200 stores the content of webpage 122 as webpage snapshot 126 (step 204); and therefore, both webpage snapshots 124 and 126 exist. However, while the refresh criteria is not met and/or exceeded, dynamic webpage content control program 200 continues to display the previously identified webpage snapshot, webpage snapshot 124 (decision 222, no branch).

In step 214, dynamic webpage content control program 200 provides a specified instance of a webpage snapshot to the group members. In one embodiment, dynamic webpage content control program 200 provides the specified instance of the webpage snapshot based on preferences as set by the group administrator. For example the group administrator through dynamic webpage content control client program 114, sets dynamic webpage content control program 200 to display webpage snapshot 124 to the group members. In another embodiment, dynamic webpage content control program 200 provides the specified instance of the webpage snapshot based on logic within dynamic webpage content control program 200 that implements initial preferences set by the group administrator. For example the group administrator, sets a refresh rate and/or refresh criteria for webpage snapshot 124. After meeting and/or exceeding the refresh rate and/or refresh criteria associated with webpage snapshot 124, dynamic webpage content control program 200 switches to webpage snapshot 126.

In some other embodiment, dynamic webpage content control program 200 determines which instance of a webpage snapshots 124 or 126 to provide. For example, after analyzing trends of the group members (step 218), dynamic webpage content control program 200 may determine each of the group members have accessed and completed an analysis of webpage snapshot 124, and therefore dynamic webpage content control program 200 replaces webpage snapshot 124 with webpage snapshot 126. In another example, based on the time zone, dynamic webpage content control program 200 may determine while a first group member accessed and completed an analysis of webpage snapshot 124, a second user in another time zone has not yet accesses webpage snapshot 124. Therefore, dynamic webpage content control program 200 selects to continue to display webpage snapshot 124 until after the second group member access and completes an analysis of webpage snapshot 124. Dynamic webpage content control program 200 pushes webpage snapshot 124 or webpage snapshot 126 to dynamic webpage content control client programs 144 and/or 154 for display through user interfaces 142 and 152.

In step 216, dynamic webpage content control program 200 monitors the activity of the group members to the provided webpage snapshot (e.g., webpage snapshot 124 or 126). Dynamic webpage content control program 200 stores information associated with individual group members accessing webpage snapshot 124 or 126, (e.g., time of day, day of the week, duration of access, frequency of access, websites accessed, relatedness of websites, completion status, geography, time zone, etc.) for further analysis. For example, a group includes two group members in which the group members a separated geographically. A first group member is located in New York operating on Eastern Standard Time (EST), and a second group member is located in California, operating on Pacific Standard Time (PST). Dynamic webpage content control program 200 stores the information associated with the first group member relative to EST, and the information associated with the second group member relative to PST for utilization during analysis.

In step 218, dynamic webpage content control program 200 determines trends within the monitored activity of the group members. Dynamic webpage content control program 200 determines the frequency in which the group members access webpage 122 (e.g., patterns of access), the frequency group members access webpage 122 based on topic, and/or the frequency in which group members visit webpage 122 (e.g., time of day, day, week, month, year, etc.) Additionally dynamic webpage content control program additionally considers geographic location information (e.g., time zone differences) when analyzing the data as a group to determine trends. Dynamic webpage content control program 200 analyses the trends of the individual group members and/or the trends within the group members (e.g., trends with respect to other group members.

For example, the first group member requests access to webpage 122 on Monday morning, 10 a.m. EST, and spends three hours accessing webpage snapshot 124, and the second group member requests access to webpage 122 on Monday afternoon, 1 p.m. PST, and spends four hours accessing webpage snapshot 124. The first group member then requests access to webpage 122 on Tuesday morning, 10 a.m. EST and spends an additional two hours accessing webpage snapshot 124 and the second group member requests access to webpage 122 on Tuesday afternoon, 1 p.m. PST, and spends an additional two hours accessing webpage snapshot 124. Dynamic webpage content control program 200 determines a trend (e.g. pattern of access) associated with the first group member (e.g., requests accesses to webpage 122 in the morning and utilizes five hours total for analysis) and a trend associated with the second group member (e.g., requests accesses to webpage 122 in the afternoon and utilizes six hours total for analysis). Additionally, dynamic webpage content control program 200 determines a trend between the first and second group members (e.g., the second group member access webpage 122 after the first group member) and based on the identified time zones, a difference of three hours exists between the first and second group members.

In step 220, dynamic webpage content control program 200 determines a refresh rate. Dynamic webpage content control program 200 determines the refresh rate based on one or more of determined trends (e.g., overall time, completion of analysis, etc.). Continuing the example, the first group member completes an analysis of webpage snapshot 124 in five hours over the course of two days, whereas the second group member completes an analysis of webpage snapshot 124 in six hours over the course of two days, starting at 10 a.m. EST and ending at 3 p.m. PST and includes a three hour time difference (e.g., 3 p.m. PST is equal to 6 p.m. EST). Dynamic webpage content control program 200 determines the refresh rate to be a minimum of thirty-two hours (e.g., overall number of hours from start to finish, 29 hrs, plus the associated time zone difference between group members, 3 hrs).

In some embodiments, dynamic webpage content control program 200 may extend or shorten the refresh rate based on real-time data. For example, an initial maximum refresh rate time of thirty-two hours is calculated, however the second group member does not access webpage 122 (e.g., webpage snapshot 124) until the twenty-eighth hour. Dynamic webpage content control program 200 may extend and/or continue to extend the refresh rate until the six hours of analysis by the second group member is complete (e.g., initially resets the refresh rate to thirty-four hours). Conversely, the second group member completes the six hours of analysis within the first twenty-four hours. Dynamic webpage content control program 200 may shorten the refresh rate and/or initiate an update dependent on the first group member (e.g., updates at the time all group members indicate completion of the analysis, sets the refresh rate based on the time associated with the first group member to completing the analysis of webpage 122). In one example, dynamic webpage content control program 200 sets the refresh rate to a minimum of twenty-six hours, and/or at the completion of five hours of analysis by the first group user, whichever occurs first. In another example, dynamic webpage content control program 200 determines the first and second group members both indicate a completion of the analysis of webpage 122, and dynamic webpage content control program 200 sets the refresh rate equal to the elapsed time, in order to initiate an update.

In some other embodiments, dynamic webpage content control program 200 utilizes the refresh rate as set initially by the group administrator within the preferences. In one embodiment, dynamic webpage content control program 200 utilizes the weekly update refresh rate regardless of a completion of analysis status by the group members. For example, within the preferences the refresh rate is set to every Monday at 9 a.m. EST, the following Monday at 9 a.m. EST, dynamic webpage content control program 200 updates webpage snapshot 124 to webpage snapshot 126. In another embodiment, dynamic webpage content control program 200 may temporarily delay the refresh rate based on real-time data. For example, the second group member is currently analyzing webpage snapshot 124. Dynamic webpage content control program 200 extends the refresh rate and maintains webpage snapshot 124 until the second group member is no longer accessing webpage snapshot 124.

In some other embodiments, dynamic webpage content control program 200 may provide information to the group administrator regarding completion status of the analysis over the time allotted by the refresh rate, thereby allowing the group administrator to potentially extend the refresh rate. In yet some other embodiments, dynamic webpage content control program 200 may notify group members that have not completed the analysis over the time allotted associated with the refresh rate of impending changes and/or steps to potentially extend and/or request an extension of the refresh rate. Additionally, in some embodiments, dynamic webpage content control program 200 may provide maximum and/or minimum completion times associated with the group members to the group administrator, thereby allowing the group administrator to potentially adjust the refresh rate for subsequent iterations.

In decision 222, dynamic webpage content control program 200 determines whether refresh criteria is met and/or exceeded (e.g., elapsed time, completion of analysis by group members, set refresh criteria preferences, combination of refresh criteria, etc.). Dynamic webpage content control program 200 compares the elapsed time with the refresh rate (e.g., calculated, set in preferences). Additionally, dynamic webpage content control program may determine whether the group members have completed the analysis of the current instance or webpage snapshot 124. In one embodiment, dynamic webpage content control program 200 determines whether the refresh criteria is met based on a single refresh criteria (e.g., meets and/or exceeds refresh rate, all group members complete analysis, refresh time not met, not all group members complete analysis, etc.). In some other embodiment, dynamic webpage content control program 200 determines whether the refresh criteria is met based on meeting multiple refresh criteria. For example, dynamic webpage content control program 200 determines both the elapsed time meets and/or exceeds the refresh rate and all the group members complete the analysis, and dynamic webpage content control program 200 further determines the refresh criteria is met. However, if dynamic webpage content control program 200 determines either the refresh rate is not met and/or not all of the group members have met the refresh criteria, then dynamic webpage content control program 200 further determines the refresh criteria is not met and/or exceeded.

If dynamic webpage content control program 200 determines refresh criteria is met and/or exceeded (decision 222, yes branch) then dynamic webpage content control program 200 determines whether multiple instances of webpage content exist (decision 210). If dynamic webpage content control program 200 determines refresh criteria is not met and/or exceeded (decision 222, no branch) then dynamic webpage content control program 200 continues to provide the current instance of webpage snapshot to group members (step 212).

Figure 3:
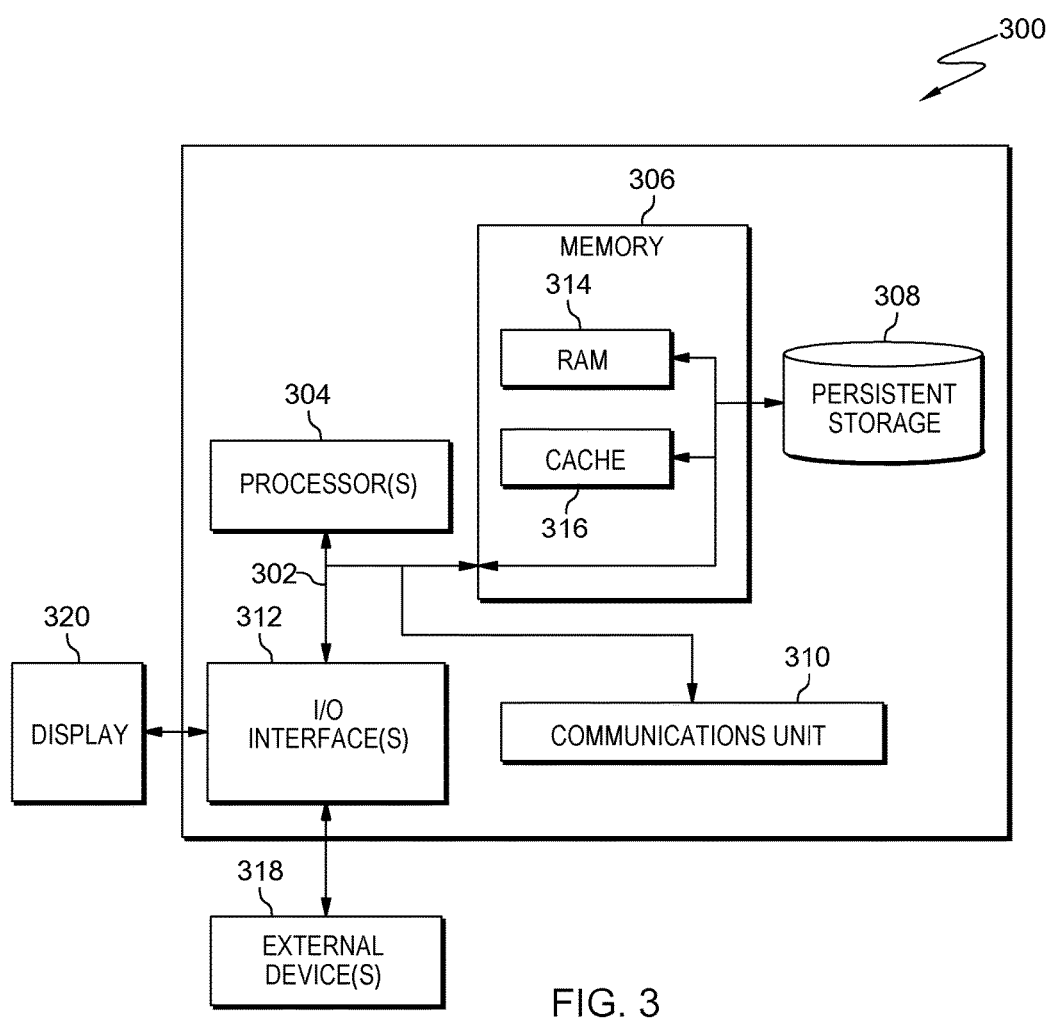
FIG. 3 is a block diagram of components of the server computer executing the dynamic webpage content control program, in accordance with an embodiment of the present invention.

FIG. 3 depicts a block diagram of components of server computer 300 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of computer processor(s) 304 by holding recently accessed data, and data near accessed data, from memory 306.

User interfaces 112, 142, and 152, dynamic webpage content control client programs 114, 144, and 154, webpage 122, webpage snapshots 124 and 126, and dynamic webpage content control program 200, may be stored in persistent storage 308 and in memory 306 for execution and/or access by one or more of the respective computer processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. User interfaces 112, 142, and 152, dynamic webpage content control client programs 114, 144, and 154, webpage 122, webpage snapshots 124 and 126, and dynamic webpage content control program 200 may be downloaded to persistent storage 308 through communications unit 310.

I/O interface(s) 312 allows for input and output of data with other devices that may be connected to server computer 300. For example, I/O interface(s) 312 may provide a connection to external device(s) 318, such as a keyboard, a keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., user interfaces 112, 142, and 152, dynamic webpage content control client programs 114, 144, and 154, webpage 122, webpage snapshots 124 and 126, and dynamic webpage content control program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing webpage content access across a group of users, the method comprising:
   receiving, by one or more computer processors, a group comprising one or more users;
   receiving, by one or more computer processors, a webpage associated with the group;
   storing, by one or more computer processors, at least one snapshot of the received webpage;
   receiving, by one or more computer processors, a request to access the received webpage from a first user and a second user, wherein the first user and the second user are members of the received group;
   selecting, by one or more computer processors, a snapshot from the stored at least one snapshot based on the received request to access the received webpage;
   providing, by one or more computer processors, the selected snapshot from the stored at least one snapshot to the first user and the second user associated with the received request;
   monitoring, by one or more computer processors, activity of the first user and activity of the second user associated with the provided selected snapshot;
   determining, by one or more computer processors, one or more trends based on the monitored activities, wherein the trends include an overall analysis time of the provided selected snapshot by the first user and the second user;
   determining, by one or more computer processors, a refresh rate based on the determined one or more trends; and
   determining, by one or more computer processors, whether a refresh criteria is met, wherein the refresh criteria is based on the overall analysis time of the provided selected snapshot by the first user and the second user.

2. The method of claim 1, wherein storing the at least one snapshot of the received webpage further comprises:
   storing, by one or more computer processors, a first snapshot of the received webpage;
   revisiting, by one or more computer processors, the received webpage;
   comparing, by one or more computer processors, the stored first snapshot to the revisited webpage;
   determining, by one or more computer processors, whether the content of the revisited webpage changes based on the comparison; and
   responsive to determining the content of the revisited webpage changes based on the comparison, storing by one or more computer processors, a second snapshot of the revisited webpage.

3. The method of claim 1, wherein selecting the snapshot from the stored at least one snapshot based on the received request to access the received webpage further comprises:
   identifying, by one or more computer processors, a first snapshot of the received webpage within the stored at least one snapshot;
   determining, by one or more computer processors, whether a second snapshot of the received webpage exists within the stored at least one snapshot; and
   responsive to determining the second snapshot of the received webpage exists within the stored the at least one snapshot, selecting, by one or more computer processors, a snapshot from the stored at least one snapshot that includes the first snapshot and the second snapshot based on preferences that are associated with at least one of: the received group and the received webpage.

4. The method of claim 1, wherein selecting, by one or more computer processors, the snapshot from the stored at least one snapshot further comprises:
   determining, by one or more computer processors, whether more than a first snapshot of the received webpage exists within the stored at least one snapshot; and
   responsive to determining more than the first snapshot of the received webpage does not exist within the stored at least one snapshot; selecting, by one or more computer processors, the first snapshot.

5. The method of claim 1,
   wherein the one or more trends include at least one of: patterns of access and frequency of access; and wherein the refresh criteria includes at least one of the determined refresh rate and a completion status associated with the first user.

6. The method of claim 1, further comprising:
responsive to determining the refresh criteria is met, determining by one or more computer processors, whether more than a first snapshot of the received webpage exists within the stored at least one snapshot; and
responsive to determining more than the first snapshot of the received webpage exists within the stored at least one snapshot, providing, by one or more computer processors, a second snapshot of the received webpage.

7. The method of claim 1, wherein the group is separated geographically in different time zones.

8. A computer program product for managing webpage content access across a group of users, the computer program product comprising:
one or more computer readable storage media and program instructions stored on the one or more computer readable storage media, the program instructions comprising:
program instructions to receive a group comprising one or more users;
program instructions to receive a webpage associated with the group;
program instructions to store at least one snapshot of the received webpage;
program instructions to receive a request to access the received webpage from a first user and a second user, wherein the first user and the second user are members of the received group;
program instructions to select a snapshot from the stored at least one snapshot based on the received request to access the received webpage;
program instructions to provide the selected snapshot from the stored at least one snapshot to the first user and the second user associated with the received request;
program instructions to monitor activity of the first user and activity of the second user associated with the provided selected snapshot;
program instructions to determine one or more trends based on the monitored activities, wherein the trends include an overall analysis time of the provided selected snapshot by the first user and the second user;
program instructions to determine a refresh rate based on the determined one or more trends; and
program instructions to determine whether a refresh criteria is met wherein the refresh criteria is based on the overall analysis time of the provided selected snapshot by the first user and the second user.

9. The computer program product of claim 8, wherein to store the at least one snapshot of the received webpage further comprises one or more of the following program instructions, stored on the one or more computer readable storage media, to:
store a first snapshot of the received webpage;
revisit the received webpage;
compare the stored first snapshot to the revisited webpage;
determine whether the content of the revisited webpage changes based on the comparison; and
responsive to determining the content of the revisited webpage changes based on the comparison, store a second snapshot of the revisited webpage.

10. The computer program product of claim 8, wherein to select the snapshot from the stored at least one snapshot based on the received request to access the received webpage further comprises one or more of the following program instructions, stored on the one or more computer readable storage media, to:
identify a first snapshot of the received webpage within the stored at least one snapshot;
determine whether a second snapshot of the received webpage exists within the stored at least one snapshot; and
responsive to determining the second snapshot of the received webpage exists within the stored the at least one snapshot, select a snapshot from the stored at least one snapshot that includes the first snapshot and the second snapshot based on preferences that are associated with at least one of: the received group and the received webpage.

11. The computer program product of claim 8, wherein to select the snapshot from the stored at least one snapshot further comprises one or more of the following program instructions, stored on the one or more computer readable storage media, to:
determine whether more than a first snapshot of the received webpage exists within the stored at least one snapshot; and
responsive to determining more than the first snapshot of the received webpage does not exist within the stored at least one snapshot; select the first snapshot.

12. The computer program product of claim 8,
wherein the one or more trends include at least one of patterns of access and frequency of access;
and
wherein the refresh criteria includes at least one of: the determined refresh rate and a completion status associated with the first user.

13. The computer program product of claim 8, further comprising one or more of the following program instructions, stored on the one or more computer readable storage media, to:
responsive to determining the refresh criteria is met, determine whether more than a first snapshot of the received webpage exists within the stored at least one snapshot; and
responsive to determining more than the first snapshot of the received webpage exists within the stored at least one snapshot, provide a second snapshot of the received webpage.

14. The computer program product of claim 8, wherein the group is separated geographically in different time zones.

15. A computer system for managing webpage content access across a group of users, the computer system comprising:
one or more computer processors, one or more computer readable storage media, and program instructions stored on the computer readable storage media for execution by at least one of the one or more processors, the program instructions comprising:
program instructions to receive a group comprising one or more users;
program instructions to receive a webpage associated with the group;
program instructions to store at least one snapshot of the received webpage;
program instructions to receive a request to access the received webpage from a first user and a second user, wherein the first user and the second user are members of the received group;

program instructions to select a snapshot from the stored at least one snapshot based on the received request to access the received webpage;

program instructions to provide the selected snapshot from the stored at least one snapshot to the first user and the second user associated with the received request;

program instructions to monitor activity of the first user and activity of the second user associated with the provided selected snapshot;

program instructions to determine one or more trends based on the monitored activities, wherein the trends include an overall analysis time of the provided selected snapshot by the first user and the second user;

program instructions to determine a refresh rate based on the determined one or more trends; and program instructions to determine whether a refresh criteria is met wherein the refresh criteria is based on the overall analysis time of the provided selected snapshot by the first user and the second user.

16. The computer system of claim 15, wherein to store the at least one snapshot of the received webpage further comprises one or more of the following program instructions, stored on the one or more computer readable storage media, to:

store a first snapshot of the received webpage;

revisit the received webpage;

compare the stored first snapshot to the revisited webpage;

determine whether the content of the revisited webpage changes based on the comparison; and responsive to determining the content of the revisited webpage changes based on the comparison, store a second snapshot of the revisited webpage.

17. The computer system of claim 15, wherein to select the snapshot from the stored at least one snapshot based on the received request to access the received webpage further comprises one or more of the following program instructions, stored on the one or more computer readable storage media, to:

identify a first snapshot of the received webpage within the stored at least one snapshot;

determine whether a second snapshot of the received webpage exists within the stored at least one snapshot; and responsive to determining the second snapshot of the received webpage exists within the stored the at least one snapshot, select a snapshot from the stored at least one snapshot that includes the first snapshot and the second snapshot based on preferences that are associated with at least one of: the received group and the received webpage.

18. The computer system of claim 15, wherein to select the snapshot from the stored at least one snapshot further comprises one or more of the following program instructions, stored on the one or more computer readable storage media, to:

determine whether more than a first snapshot of the received webpage exists within the stored at least one snapshot; and responsive to determining more than the first snapshot of the received webpage does not exist within the stored at least one snapshot; select the first snapshot.

19. The computer system of claim 15, wherein the one or more trends include at least one of patterns of access and frequency of access; and wherein the refresh criteria includes at least one of: the determined refresh rate and a completion status associated with the first user.

20. The computer system of claim 15, further comprising one or more of the following program instructions, stored on the one or more computer readable storage media, to:

responsive to determining the refresh criteria is met, determine whether more than a first snapshot of the received webpage exists within the stored at least one snapshot; and responsive to determining more than the first snapshot of the received webpage exists within the stored at least one snapshot, provide a second snapshot of the received webpage.

* * * * *